United States Patent [19]

Attig et al.

[11] Patent Number: 4,511,548
[45] Date of Patent: Apr. 16, 1985

[54] AMMOXIDATION OF METHANOL TO PRODUCE HYDROGEN CYANIDE

[75] Inventors: T. G. Attig, Aurora; R. K. Grasselli, Chagrin Falls, both of Ohio

[73] Assignee: The Standard Oil Company, Cleveland, Ohio

[21] Appl. No.: 521,817

[22] Filed: Aug. 10, 1983

Related U.S. Application Data

[63] Continuation of Ser. No. 332,034, Dec. 18, 1981, abandoned.

[51] Int. Cl.$^3$ .............................................. C01C 3/02
[52] U.S. Cl. .................................... 423/376; 502/208; 502/209; 502/210; 502/211; 502/212; 502/213
[58] Field of Search ................ 423/372, 376; 502/208, 502/209, 210, 211, 212, 213

[56] References Cited

U.S. PATENT DOCUMENTS

| 3,254,110 | 5/1966 | Sennewald et al. | 502/211 |
| 3,911,089 | 10/1975 | Shiraishi et al. | 423/376 |
| 3,988,359 | 10/1976 | Saito et al. | 502/210 |
| 4,083,804 | 4/1978 | Saito et al. | 502/211 |
| 4,316,856 | 2/1982 | Guttmann et al. | 260/465.3 |
| 4,322,368 | 3/1982 | Guttmann et al. | 260/465.3 |
| 4,324,908 | 4/1982 | Grasselli et al. | 502/208 |
| 4,415,482 | 11/1983 | Ebner | 502/242 |
| 4,419,270 | 12/1983 | Ueshima et al. | 502/208 |

FOREIGN PATENT DOCUMENTS

| 2441109 | 3/1975 | Fed. Rep. of Germany | 502/211 |
| 20476 | 10/1967 | Japan | 502/211 |
| 10200 | 1/1976 | Japan | |
| 140930 | 11/1981 | Japan | 502/208 |
| 2040717 | 9/1980 | United Kingdom | 502/211 |

Primary Examiner—John Doll
Assistant Examiner—Wayne A. Langel
Attorney, Agent, or Firm—Charles S. Lynch; John E. Miller, Jr.; Larry W. Evans

[57] ABSTRACT

Promoted antimony phosphate oxide complexes are excellent catalysts for the ammoxidation of methanol to HCN especially at high methanol throughputs.

9 Claims, No Drawings

AMMOXIDATION OF METHANOL TO PRODUCE HYDROGEN CYANIDE

This is a continuation of application Ser. No. 332,034 filed 12/18/81 now abandoned.

BACKGROUND OF THE INVENTION

The present invention relates to a technique for preparing hydrogen cyanide by the ammoxidation of methanol, formaldehyde and/or dimethylether.

It is already known that methanol can be ammoxidized to HCN using various oxide complex catalysts. See, for example, Japanese published applications: Nos. J76-10,200, J76-11,100, J76-99,700, J78-149,899 J78-149,900, J79-126,698, J79-69,597, J79-76,500 and J79-71,799. Molybdates, antimonates and tungstates serve as catalysts in these processes.

Although these patents indicate that HCN can be produced in high yields, close examination shows that the processes are conducted under very mild conditions. As well appreciated by those skilled in catalysis, the ability of a catalyst to convert reactant into desired product decreases as the amount of reactant per unit weight of catalyst per unit time (i.e. throughput) increases. The processes described in the above noted Japanese published applications have very low reactant throughputs meaning that a large amount of expensive catalyst is necessary to produce a given amount of product.

Accordingly, it is an object of the present invention to provide a new process for ammoxidizing methanol as well as formaldehyde and dimethylether to HCN which employs a catalyst capable of giving good yields of HCN at high reactant throughput.

SUMMARY OF THE INVENTION

This and other objects are accomplished by the present invention which is based on the discovery that certain promoted antimony phosphate oxide complexes are excellent catalysts for the ammoxidation of methanol to HCN. Dimethylether and/or formaldehyde can also be ammoxidized with these catalysts at high yields and high throughputs.

Thus, the present invention provides a novel process for ammoxidizing a reactant selected from the group consisting of methanol, formaldehyde and dimethylether to produce HCN, the process comprising contacting the reactant, ammonia and oxygen at a temperature of 200°  to 600° C. in the vapor phase with an oxide complex catalyst of the formula $$A_aQ_bD_cSb_dP_eO_x$$

wherein
- A is one or more of elements selected from alkali metals, alkaline earth metal, Group IB metals, Co, Cu, Bi, Tl, Sn, Te and B;
- Q is Ce, Cr or Th;
- D is Mo, W, V and/or Fe; and wherein
- a=0–6;
- b=0–6;
- c=0.001–10;
- d=1–16;
- e=8–16; and
- x is determined by the oxidation states of the other elements.

DETAILED DESCRIPTION

Catalysts

The catalysts employed in the inventive process are antimony phosphate oxide complexes promoted with one or more additional elements. They can be described by the following formula:

wherein
- A is one or more of elements selected from alkali metals, alkaline earth metal, Group IB metals, Co, Cu, Bi, Tl, Sn, Te and B;
- Q is Ce, Cr or Th;
- D is Mo, W, V and/or Fe; and wherein
- a=0–6, preferably 0–3;
- b=0–6, preferably 0–4;
- c=0.001–10, preferably 0.1–5;
- d=1–16, preferably 2–12;
- e=8–16, preferably 12; and
- x is determined by the oxidation states of the other elements.

A preferred group of catalysts are those which are described by the following formula:

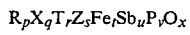

wherein
- R is one or more elements selected from Groups IA and IB of the Periodic Table and Tl, preferably a Group IA element;
- X is Bi, Te or mixtures thereof;
- T is Cr, Co, Cu, Ce, Th, B, Sn or mixtures thereof; and
- Z is W, mo, V or mixtures thereof, preferably Mo, and further wherein
- p=0 to 3, preferably 0 to 1;
- q=0 to 1, preferably 0 to 0.5;
- r=0 to 4, preferably 0 to 3;
- s=0 to 3, preferably 0.05 to 1.5;
- t=0 to 5, preferably 0.1 to 3.5;
- u=5 to 10;
- v=4 to 10; and
- x is a number sufficient to satisfy the valence requirements of the other elements present.

In these catalysts, u/v is preferably 1/2 to 3/2, more preferred 1.3/2 to 2.3/2.

The oxide complex catalysts of the present invention can be used in unsupported form or supported on a suitable support. Any conventional support such silica, alumina, titania, zeolites, alundum, natural clays and so forth can be employed as supports. The preferred support is silica.

The catalysts of the present invention can be prepared by techniques adapted from the known SbPO$_4$ synthesis from phosphoric acid and Sb$_2$O$_3$ disclosed in Robbins, J. Inorg. Nuclear Chem. 19, 183–5 (1961). See also Brittish Pat. No. 792,997. One general technique involves dissolving compounds of the catalytic elements in hot H$_3$PO$_4$, followed by the addition of silica or other support and Sb$_2$O$_3$, digestion, drying and calcination. Digestion can occur from thirty minutes to ten hours at 50° C. to 100° C. while calcination can occur for one-half to fifty hours at 400° C. to 800° C. Compounds used to supply the elements of the catalyst can be any compound of the type normally used during catalyst preparation. For example ammonium heptamolybdate can be used to supply molybdenum while 12-molybdophosphoric acid can be used to supply both molybdenum and phosphorus. $TeO_2$ can be used to supply tellurium, $Sb_2O_3$ to supply antimony, $NH_4VO_3$ to supply vanadium and the other metals can be supplied in the form of nitrates and/or acetates. Pentavalent antimony can be supplied in the form of antimony pentachloride or other pentavalent antimony compounds. Details of other modified procedures for preparing catalysts in accordance with the present invention can be found in the working examples.

Ammoxidation

The present invention is most conveniently carried out using methanol as the reactant. However, it is also applicable to dimethylether and formaldehyde.

The general ammoxidation process for converting methanol to HCN is well known and described in the various Japanese published applications previously cited. In general, the ammoxidation reaction is accomplished by contacting the reactant, oxygen and ammonia with a particular catalyst in the vapor phase. The inventive reaction is carried out in the same manner generally set forth in these patents.

In a preferred aspect, the inventive process comprises contacting a mixture comprising the reactant, ammonia and oxygen with the above catalyst at elevated temperature and at atmospheric or near atmospheric pressure.

Any source of oxygen may be employed in this process. For economic reasons, however, it is preferred that air be employed as the source of oxygen. From a purely technical viewpoint, relatively pure molecular oxygen will give similar results. The molar ratio of oxygen to the reactant in the feed should be in the range of 0.5:1 to 4:1 and the ratio of about 1:1 to 3:1 is preferred.

Low molecular weight, saturated hydrocarbons do not appear to influence the reaction to an appreciable degree, and these materials can be present. Consequently, the addition of saturated hydrocarbons to the reaction feed is contemplated within the scope of this invention. Likewise, diluents, such as nitrogen and the oxides of carbon, may be present in the reaction mixture without deleterious effects.

The molar ratio of ammonia to reactant in the feed may vary between about 0.05:1 to 5:1. There is no real upper limit for the ammonia/olefin ratio, but there is generally no reason to exceed the 5:1 ratio. At ammonia/reactant ratios appreciably less that the stoichiometric ratio of 1:1, various amounts of oxygenated derivatives of the reactant will form.

Water can also be included in the feed although it is not essential. In some instances, e.g. fixed-bed systems, water may improve the selectivity of the reaction and the yield of the HCN. However, reactions not including water in the feed are also within the scope of the present invention.

In general, the molar ratio of added water to reactant, when water is added, is in the neighborhood of 0.1:1 or higher. Ratios on the order of 1:1 to 3:1 are particularly desirable but higher ratios may be employed, i.e. up to about 10:1.

The reaction is carried out at an elevated temperature such as 200° C. to 600° C., preferably 350° C. to 500° C. The pressure at which the reaction is conducted can vary widely but is preferably at about atmospheric or slightly above atmospheric (2 to 3 atm) pressure. In general, high pressures, i.e. above 15 atm, are not desirable since higher pressures tend to favor the formation of undesirable by-products.

The apparent contact time is not critical, and contact times in the range of from 0.1 to 50 seconds may be employed. The optimal contact time will, of course, vary depending the reactant being used, but in general, contact times of from 0.5 to 15 seconds are preferred. Fluid bed operation is the preferred operating mode and for such operation contact times on the order of 1 to 10, preferably 2 to 6, more preferably 3 to 6 seconds are appropriate.

Furthermore, the reactant throughput of the inventive process can also vary widely. For example, the throughput, measured in terms of WWH, which is defined as the weight of reactant fed per unit weight of catalyst per unit time is in general between 0.01 and 1.0, preferably 0.02 to 0.5 hr.$^{-1}$. As indicated above, a significant advantage of the invention is that the catalysts of the inventive process are capable of producing HCN in high yields at high throughputs. In other words, for a given WWH, the catalysts of the invention can produce HCN in higher yields than other known catalysts.

The inventive ammoxidation reaction is carried out in the vapor phase. Normally, the process in conducted on a continuous basis using either a fixed-bed or fluid-bed catalyst. However, a batch operation can be employed.

In a particularly preferred embodiment of the invention, methanol ammoxidation is carried out together with propylene ammoxidation in the manufacture of acrylonitrile. The ammoxidation of propylene and isobutylene to acrylonitrile and methacrylonitrile with bismuth or tellurium rare earth molybdates is described in commonly assigned applications Ser. No. 108,327, filed Dec. 31, 1979, now U.S. Pat. No. 4,316,856 and Ser. No. 107,941, filed Dec. 28, 1979, now U.S. Pat. No. 4,322,368, the disclosures of which are incorporated herein by reference. Propylene and isobutylene ammoxidation is carried out under essentially the same conditions as methanol ammoxidation herein, and consequently both reactions can be carried out simultaneously simply by introducing both methanol and the olefin into the same reactor.

WORKING EXAMPLES

In order to more thoroughly describe the present invention, methanol was ammoxidized in a number of experiments using various different catalysts in accordance with the invention. Unless otherwise indicated, 5 cc of catalyst was contacted with a feed comprising 1 methanol/1.2 $NH_3$/10 air/2.25 water at a contact time of 1 second, a WWH of 0.18 and a temperature between 400° and 420° C. The gross reaction product was recovered and analyzed, and the amount of HCN, CO and $CO_2$ by-products determined.

The catalysts were prepared by the general technique described above. As an example, the catalyst of Example 1 was prepared in the following manner: To 25.8 g of 85% $H_3PO_4$ was added to 4.20 g of ammonium heptomolybdate in 15 ml distilled water. To this solution was added 33.9 g of 40% silica sol followed by 35 g of $Sb_2O_3$. The mixture was stirred with heating until a thick putty-like paste was obtained. This mixture was heated at 110° C. overnight and then 350° C. for five hours to give 80% $Sb_{10}Mo_1P_{9.33}O_x$—20% $SiO_2$ which was ground and screened and heat treated at 550° C. for five hours.

The composition of the various catalysts employed, the reaction temperature and the results obtained are set forth in the following Table I. Unless otherwise indicated, all catalysts contain 20% $SiO_2$ as a support.

Comparative Example A

Example 6 of Japanese published application No. J79-126,698 shows ammoxidizing methanol using a catalyst comprising 50% $K_{0.006}Bi_{0.45}Fe_{0.65}P_{0.1}MoO_x - 50\%$ $SiO_2$, which can also be written 50%

TABLE I

Methanol Ammoxidation
Feed: 1 MeOH/1.2 $NH_3$/10 Air/2.25 $H_2O$

| Example No. | Catalyst | Temp (°C.) | % Yield HCN | CO | $CO_2$ | Select |
|---|---|---|---|---|---|---|
| 1 | $Sb_{10}Mo_1P_{9.33}O_x$ | 410 | 77.4 | 9.3 | 4.1 | 85.2 |
| 2 | $K_{.1}Sb_{9.67}Mo_1P_{9.33}O_x$ | 410 | 79.1 | 10.0 | 6.9 | 82.4 |
| 3 | $K_{.05}Sb_{10}Mo_1P_{9.33}O_x$ | 412 | 79.7 | 3.9 | 2.1 | 93.0 |
| 4 | $K_{.05}Sb_{10}Mo_1P_{9.33}O_x$ | 430 | 87.4 | 4.7 | 2.5 | 92.4 |
| 5 | $K_1Sb_{10}Mo_1P_{9.33}O_x$ | 412 | 79.7 | 9.1 | 3.2 | 86.6 |
| 6 | $Na_{.05}Sb_{10}Mo_1P_{9.33}O_x$ | 412 | 78.5 | 8.0 | 4.5 | 86.3 |
| 7 | $Sb_{10}V_1P_{9.67}O_x$ | 410 | 69.7 | 15.3 | 4.0 | 78.3 |
| 8 | $Sb_{9.67}Cr_{.33}Mo_1P_{9.33}O_x$ | 410 | 75.8 | 16.9 | 5.4 | 77.3 |
| 9 | $Sb_{9.67}Co_{.33}Mo_1P_{9.33}O_x$ | 415 | 57.5 | 24.3 | 9.6 | 62.9 |
| 10 | $Sb_7Fe_3P_{10}O_x + MoO_3$ | 410 | 81.9 | 9.0 | 2.3 | 87.9 |
| 11 | $K_{.1}Sb_{9.67}Cr_{.33}Mo_1P_{9.33}O_x$ | 410 | 73.0 | 15.0 | 7.3 | 76.6 |
| 12 | $Sb_{9.9}Bi_{.1}Mo_{.3}P_{9.8}O_x$ | 410 | 71.9 | 22.0 | 4.1 | 73.4 |
| 13 | $Sb_9Fe_1Mo_{.33}P_{9.78}O_x$ | 410 | 80.8 | 10.4 | 4.5 | 84.4 |
| 14 | $Sb_{9.67}Fe_{.33}Mo_1P_{9.33}O_x$ | 411 | 66.4 | 16.9 | 7.8 | 72.9 |
| 15 | $Sb_{9.33}Fe_{.67}Mo_1P_{9.33}O_x$ | 410 | 73.0 | 16.9 | 7.8 | 74.7 |
| 16 | $Sb_{9.67}Fe_{.33}Mo_1P_{9.33}O_x$ | 410 | 70.8 | 12.5 | 5.4 | 79.6 |
| 17 | $Sb_9Fe_1Mo_1P_{9.33}O_x$ | 410 | 85.2 | 5.6 | 3.6 | 90.3 |
| 18 | $Sb_9Fe_1Mo_{.33}P_{9.78}O_x$ | 410 | 76.3 | 9.0 | 2.1 | 87.3 |
| 19 | $Sb_7Fe_3Mo_1P_{9.33}O_x$ | 410 | 87.4 | 5.7 | 3.0 | 90.9 |
| 20 | $Sb_7Fe_3Mo_{.33}P_{9.78}O_x$ | 410 | 87.4 | 6.6 | 2.3 | 90.8 |
| 21 | $Sb_7Fe_3Mo_{.1}P_{9.93}O_x$ | 410 | 88.5 | 7.4 | 3.3 | 89.2 |
| 22 | $Sb_6Fe_4Mo_1P_{9.33}O_x$ | 406 | 87.0 | 3.8 | — | 95.8 |
| 23 | $K_{.1}Sb_7Fe_3Mo_1P_{9.33}O_x$ | 415 | 81.4 | 3.8 | 2.8 | 92.5 |
| 24 | $Cs_{.05}Sb_7Fe_3Mo_1P_{9.33}O_x$ | 415 | 84.3 | 4.4 | — | 95.0 |
| 25 | $Sb_{10}Bi_{.33}Fe_{.33}Mo_1P_{10}O_x$ | 410 | 79.7 | 11.7 | 4.8 | 82.8 |
| 26 | $Sb_{8.9}Bi_{.1}Fe_1Mo_{.33}P_{9.73}O_x$ | 410 | 80.8 | 11.8 | 2.2 | 85.4 |
| 27 | $Sb_{6.9}Bi_{.1}Fe_3Mo_{.33}P_{9.78}O_x$ | 410 | 86.3 | 9.7 | 4.3 | 86.3 |
| 28 | $Sb_{9.6}Bi_{.1}Fe_{.3}Mo_{.3}P_{9.73}O_x$ | 410 | 76.3 | 11.9 | 2.2 | 84.4 |
| 29 | 80% $Sb_1Fe_3Mo_1P_{9.33}O_x$ —20% $Al_2O_3$ | 414 | 76.6 | 5.6 | 9.2 | 83.8 |
| 30 | $Sb_{6.67}V_2Mo_1P_{9.33}O_x$ | 410 | 88.2 | 4.4 | 2.2 | 93.0 |
| 31 | $K_{.05}Sb_{10}V_1Mo_{.3}P_{9.5}O_x$ | 410 | 77.4 | 4.4 | 3.4 | 90.8 |
| 32 | $Sb_{10}V_1Mo_{.3}P_{9.5}O_x$ | 415 | 84.1 | 10.1 | 2.2 | 87.2 |
| 33 | $Sb_{10}V_{.33}Mo_{.3}P_{9.22}O_x$ | 410 | 76.3 | 12.6 | 6.4 | 80.1 |
| 34 | $Sb_{6.67}V_2Mo_{.33}P_{9.78}O_x$ | 415 | 80.2 | 5.5 | 2.7 | 90.7 |
| 35 | $Sb_{8.33}V_1Mo_{.33}P_{9.78}O_x$ | 415 | 74.2 | 16.7 | 4.2 | 78.0 |
| 36 | $Sb_{6.67}V_2Mo_{.1}P_{9.93}O_x$ | 415 | 78.1 | 5.9 | — | 93.0 |
| 37 | $Sb_{6.67}V_2Mo_1P_{9.33}O_x$ | 415 | 80.1 | 2.7 | 2.2 | 94.2 |
| 38 | $K_{.1}Sb_{6.67}V_2Mo_1P_{9.33}O_x$ | 413 | 80.1 | 3.0 | 2.3 | 93.8 |
| 39 | $Sb_9Fe_{.5}Cr_{.5}Mo_1P_{9.33}O_x$ | 410 | 81.9 | 11.9 | 4.4 | 83.4 |
| 40 | $Sb_9Fe_{.5}V_{.3}Mo_1P_{9.33}O_x$ | 410 | 63.1 | 3.7 | — | 94.5 |
| 41 | $Sb_{8.67}Ce_1Mo_1P_{9.33}O_x$ | 408 | 71.9 | 14.3 | 5.4 | 78.5 |
| 42 | $Sb_{8.67}Ce_1Mo_{.33}P_{9.78}O_x$ | 409 | 66.4 | 24.0 | 4.4 | 70.0 |
| 43 | $Sb_{9.56}Ce_{.33}Mo_1P_{9.33}O_x$ | 411 | 80.8 | 3.0 | 3.6 | 92.4 |
| 44 | $Sb_6Ce_3Mo_1P_{9.33}O_x$ | 411 | 64.2 | 23.9 | 9.3 | 65.9 |
| 45 | $K_{.1}Sb_{8.67}Ce_1Mo_{.33}P_{9.78}O_x$ | 410 | 78.9 | 15.8 | 2.2 | 81.4 |
| 46 | $K_{.1}Sb_6Ce_3Mo_1P_{9.33}O_x$ | 410 | 64.9 | 22.9 | 5.2 | 69.8 |
| 47 | $Sb_{9.87}Ce_{.1}Mo_1P_{9.33}O_x$ | 410 | 84.0 | 2.7 | 2.3 | 94.4 |
| 48 | $Sb_{8.9}Bi_{.1}Fe_1Mo_{.33}P_{9.73}O_x$ | 410 | 80.2 | 11.8 | 2.2 | 84.6 |
| 49 | $Sb_5V_3Mo_1P_{9.33}O_x$ | 411 | 83.7 | 3.9 | 3.1 | 92.3 |
| 50 | $Sb_6Fe_4Mo_1P_{9.33}O_x$ | 406 | 87.0 | 3.8 | — | 95.8 |
| 51* | $Sb_6Fe_4Mo_1P_{9.33}O_x$ | 412 | 80.8 | 9.5 | 3.6 | 86.0 |
| 52 | $Cs_{.05}Sb_7Fe_3Mo_1P_{9.33}O_x$ | 415 | 84.3 | 4.4 | — | 95.0 |
| 53* | $Cs_{.05}Sb_7Fe_3Mo_1P_{9.33}O_x$ | 410 | 72.9 | 11.1 | 3.9 | 82.9 |
| 54 | $Sb_{6.67}V_2Mo_1P_{9.33}O_x$ | 415 | 80.1 | 2.7 | 2.2 | 94.2 |
| 55* | $Sb_{6.67}V_2Mo_1P_{9.33}O_x$ | 417 | 79.1 | 13.0 | 6.8 | 80.0 |

*Contact time was 3 seconds and WWH was 0.052 hr.$^{-1}$

From the foregoing table, it can be seen that various antimony phosphate oxide complexes provide excellent yields of HCN in the ammoxidation of methanol carried out at high throughput. Furthermore, it will be noticed that certain promoters and promoter combinations, for example Fe+V, Fe+Cr and Ce, actually decrease catalyst performance and accordingly these should be avoided if possible.

$K_{0.07}Fe_{7.8}Bi_{5.4}P_{1.2}Mo_{12}O_x - 50\%$ $SiO_2$. Methanol conversion is reported as 97.8% and HCN yields are reported as 93.1%. However, the reactant mix of 1 $CH_3OH/1.35$ $NH_3/1.5$ $O_2/1$ $H_2O$ is diluted with helium so that the gross reactant mix is composed of 97% helium and only 3% of the above reactants. This translates to a WWH of about 0.017. Also, the contact time as only 1 second. Operating with such a great amount of dilutant at such low WWH is unfeasible on a commercial basis. Also, such short contact times are suitable only for fixed bed reactions where the advantage of fluid-bed operation are lost.

The above catalyst was tested under more rigorous conditions wherein a feed comprising 1 CH$_3$OH/1.2 NH$_3$/10 Air/2.25 H$_2$O was contacted with 5 cc of the catalyst at 410° C. at a contact time of 1 second and a WWH of 0.18 hr.$^{-1}$. Under these conditions of much higher throughout, the HCN yields were only 70.0%. This shows that the capability of the catalyst to produce HCN drops off significantly when the reactant throughput is increased to commercially feasible levels.

Comparative Example B

Commonly assigned Ser. No. 108,327, filed Dec. 31, 1979, now U.S. Pat. No. 4,316,856 teaches in passing that the antimony phosphate oxide complexes described therein are useful in the ammoxidation of alcohols containing 3 to 9 carbon atoms. No. examples, however, are presented. The case does contain numerous examples of propylene ammoxidation with the best acrylonitrile yield being 70.6% and the average acrylonitrile yield of the 68 working examples being 49.6%.

It is well known in the art that the best catalysts available for propylene ammoxidation give acrylonitrile yields in the laboratory of over 80%. See Examples 2 and 6 of U.S. Pat. No. 4,167,494. Comparison of the examples in Ser. No. 108,327 now U.S. Pat. No. 4,316,856 with those of U.S. Pat. No. 4,167,494 establishes that the antimony phosphates of U.S. Pat. No. 4,316,856 are poor propylene ammoxidation catalysts relative to others. Such catalysts, however, when used in the ammoxidation of methanol provide results comparable to the best known catalysts for this reaction.

This is illustrated by the following Table II which summarizes the results obtained when various complex bismuth molybdates as described in U.S. Pat. No. 4,167,494 are used to ammoxidize methanol under the same conditions as Examples 1 to 55 at 1 second contact time.

TABLE II

| COMP. EX. | CATALYST | TEMP. °C. | HCN YIELD |
|---|---|---|---|
| B | K$_{0.1}$Ni$_{2.5}$Co$_{4.5}$Fe$_3$Bi$_1$P$_{0.5}$Mo$_{12}$O$_x$* | 415 | 36.0 |
| C | K$_{0.1}$Ni$_{2.5}$Co$_{4.5}$Fe$_3$Bi$_1$P$_{0.5}$Mo$_{12}$O$_x$ | 420 | 80.2 |
| D | K$_{0.1}$Ni$_{2.5}$Co$_{4.5}$Fe$_3$Bi$_1$P$_{0.5}$Mo$_{12}$O$_x$ | 400 | 83.1 |
| E | K$_{0.1}$Ni$_{2.5}$Co$_{4.5}$Fe$_3$Bi$_1$P$_{0.5}$Mo$_{12}$O$_x$ | 375 | 64.7 |
| F | K$_{0.1}$Ni$_{2.5}$Co$_{4.5}$Fe$_3$Bi$_1$P$_{0.5}$Mo$_{12}$O$_x$ | 440 | 87.4 |
| G | K$_{0.1}$Ni$_{2.5}$Co$_{4.5}$Fe$_3$BiP$_{0.5}$W$_6$Mo$_{12}$O$_x$ | 426 | 86.0 |
| H | Fe$_{4.5}$Bi$_{4.5}$P$_1$Mo$_{12}$O$_x$ | 425 | 84.8 |
| I | Bi$_{12.5}$P$_1$Mo$_{12}$O$_x$ | 420 | 83.7 |
| J | Bi$_{12.5}$P$_1$Mo$_{12}$O$_x$ |  | 86.0 |

*Catalyst supported on 50% SiO$_2$ and contact time was 4 seconds.

Table II shows that complex bismuth molybdates are capable of yielding HCN with yields up to 87% in the ammoxidation of methanol. The examples herein show that the catalysts of the invention can also provide HCN with yields as high as 87% and even higher in this reaction. Since U.S. Pat. No. 4,316,856 when considered in context with the prior art establishes that antimony phosphates are poor propylene ammoxidation catalysts, the fact that they are capable of ammoxidizing methanol to produce HCN with the high yields shown herein is unexpected.

Attention is also directed to commonly assigned Ser. No. 107,941, filed Dec. 28, 1979, now U.S. Pat. No. 4,322,368 which teaches that antimony phosphates containing copper are also effective ammoxidation catalysts for the ammoxidation of propylene as well as 3 to 9 carbon atom alcohols. Table III below summarized two experiments conducted to show the effect of copper addition in when such catalysts are used in the ammoxidation of methanol. The experiments in this table were conducted under the same conditions as the above examples.

TABLE

| EX. | CATALYST | TEMP. °C. | HCN YIELD |
|---|---|---|---|
| 56 | Sb$_{10}$Mo$_1$P$_{9.33}$O$_x$ | 410 | 77.4 |
| K | Sb$_{9.67}$Cu$_{0.33}$P$_{9.33}$O$_x$ | 410 | 4.0 |

Table III and U.S. Pat. No. 4,322,368 shows that while copper-containing antimony phosphates may be effective propylene ammoxidation catalysts, inclusion of copper drastically reduces the effectiveness of the catalysts in the ammoxidation of methanol to HCN. This in turn illustrates that catalysts are specific to reactions and that it is impossible to predict the effectiveness of a catalyst in one reaction based on its effectiveness in a closely analogous reaction.

Although only a few embodiments of the invention have been illustrated above, it should be appreciated that many modifications can be made without departing from the spirit and scope of the invention. All such modifications are intended to be included within the scope of the present invention, which is to be limited only by the following claims:

We claim:

1. A process for ammoxidizing a reactant selected from the group consisting of methanol, formaldehyde and dimethyl ether to produce HCN, said process comprising contacting said reactant, ammonia and oxygen at a temperature of 200° to 600° C. in the vapor phase with an oxide complex catalyst of the formula

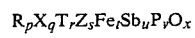

$$R_pX_qT_rZ_sFe_tSb_uP_vO_x$$

wherein
R is one or more elements selected from Groups IA and IB of the Periodic Table and tl;
X is Bi, Te or mixtures thereof;
T is Cr, Co, Cu, Ce, Th, B, Sn or mixtures thereof; and
Z is W, Mo, V or mixtures thereof, and further
wherein
p=0 to 3,
q=0 to 1,
r=0 to 4,
s=0 to 3,
t=0 to 5,
u=5 to 10,
v=4 to 10, and
x is a number sufficient to satisfy the valence requirements of the other elements present,
and wherein u/v is ½ to 3/2.

2. The process of claim 1 wherein
p=0 to 1;
q=0 to 0.5;
r=0 to 3;
s=0.05 to 1.5; and
t=0.1 to 3.5

3. The process of claim 3 wherein Z is at least Mo.

4. The process of claim 1 wherein said catalyst contains an alkali metal.

5. The process of claim 1 wherein said catalyst contains bismuth.

6. The process of claim 1 wherein said reactant is methanol.

7. The process of claim 6 wherein said catalyst contains Mo.

8. The process of claim 7 wherein said catalyst contains iron.

9. The process of claim 1 wherein said reactant is methanol and further wherein propylene is also contacted with said catalyst so that methanol and propylene are simultaneously ammoxidized to HCN an acrylonitrile, respectively.

* * * * *